(12) United States Patent
Takayama (10) Patent No.: US 7,995,844 B2
(45) Date of Patent: Aug. 9, 2011

(54) CONTROL APPARATUS, CONTROL METHOD, AND PROGRAM FOR IMPLEMENTING THE METHOD

(75) Inventor: Hirosuke Takayama, Tokyo (JP)

(73) Assignee: Canon Kabushiki Kaisha (JP)

( * ) Notice: Subject to any disclaimer, the term of this patent is extended or adjusted under 35 U.S.C. 154(b) by 939 days.

(21) Appl. No.: 11/938,411

(22) Filed: Nov. 12, 2007

(65) Prior Publication Data

US 2008/0118157 A1 May 22, 2008

(30) Foreign Application Priority Data

Nov. 22, 2006 (JP) ................................ 2006-316116

(51) Int. Cl.
*G06K 9/66* (2006.01)
(52) U.S. Cl. ...................................... 382/190; 382/103
(58) Field of Classification Search .................. 382/103, 382/154, 190, 195; 700/245
See application file for complete search history.

(56) References Cited

U.S. PATENT DOCUMENTS

| 7,684,894 | B2 * | 3/2010 | Sakai et al. ................... | 700/245 |
| 2003/0044083 | A1 * | 3/2003 | Mekata ........................... | 382/282 |
| 2004/0085457 | A1 | 5/2004 | Thorland et al. | |
| 2004/0141067 | A1 * | 7/2004 | Nakayama et al. ......... | 348/222.1 |
| 2005/0185835 | A1 * | 8/2005 | Matsugu et al. .............. | 382/159 |
| 2007/0242856 | A1 * | 10/2007 | Suzuki et al. .................. | 382/103 |
| 2008/0118157 | A1 * | 5/2008 | Takayama ..................... | 382/195 |

FOREIGN PATENT DOCUMENTS

| JP | 09-116886 A | 5/1997 |
| JP | 2000-151972 A | 5/2000 |
| JP | 2001-128152 A | 5/2001 |
| JP | 2001-145094 A | 5/2001 |
| JP | 2002-304651 A | 10/2002 |
| JP | 2003-134413 A | 5/2003 |
| JP | 2004-153832 A | 5/2004 |
| JP | 2004-172655 A | 6/2004 |
| JP | 2005-86682 A | 3/2005 |
| JP | 2005-294912 A | 10/2005 |

OTHER PUBLICATIONS

Office Action issued in corresponding application JP2006-316116, dated Nov. 7, 2008.

* cited by examiner

*Primary Examiner* — Gregory M Desire
(74) *Attorney, Agent, or Firm* — Rossi, Kimms & McDowell LLP (57) ABSTRACT

A control apparatus capable of further improving operability and flexibility of operations related to the image. Images inputted by a network camera are displayed on an digital TV. Operations related to an image display function of the digital TV are performed by a remote controller. Objects in an image inputted by the network camera are recognized. A region related to the objects based on object information obtained by an image recognizing unit is extracted. Region operations for implementing region extraction are allowed, and the extracted region is selected by performing at least one of range control and change of extracted region on the extracted region. Predetermined controls on the extracted region selected by a region selecting unit are performed.

11 Claims, 8 Drawing Sheets

| AREA NAME | SIZE | POSITION COORDINATES (CENTRAL POINT) |
|---|---|---|
| AREA501 | 100 | (X1,Y1) |
| AREA502 | 100 | (X2,Y1) |
| AREA503 | 100 | (X3,Y1) |
| AREA504 | 130 | (X4,Y2) |
| AREA505 | 150 | (X5,Y3) |
| AREA506 | 30 | (X6,Y4) |
| AREA507 | 30 | (X7,Y4) |
| AREA508 | 30 | (X8,Y4) |
| AREA509 | 30 | (X9,Y5) |
| AREA510 | 30 | (X10,Y5) |
| AREA511 | 30 | (X11,Y6) |

CONTROL APPARATUS, CONTROL METHOD, AND PROGRAM FOR IMPLEMENTING THE METHOD

BACKGROUND OF THE INVENTION

1. Field of the Invention

The present invention relates to a control apparatus for suitably selecting a predetermined region in an observed image region, a control method, and a program for implementing the method.

2. Description of the Related Art

In recent years, with the spread of the internet and the move from analog to digital in products such as televisions and cameras, people have become capable of dealing normally with higher levels of functionality than in the past.

For instance, people are able to select predetermined regions included in an image while observing images on a predetermined image display device such as a computer terminal, a mobile telephone, or a digital TV, and thereby perform an operation that is preset for the selected region. Operations such as trimming to form trimmed regions and operations to cause display at a lower resolution can be performed in the same way.

In one technology for selecting predetermined regions, two points are freely indicated on the displayed image screen, and used as diagonally opposing corners for defining the range of a rectangular region (see, for instance, Japanese Laid-Open Patent Publication (Kokai) No. 2001-145094). In another technology, a central point of the region is freely indicated, and enlargement/reduction with the central point at the center is then specified (see, for instance, Japanese Laid-Open Patent Publication (Kokai) No. 2004-172655) In a further technology, rectangles of predetermined sizes are freely moved to select a region (see, for instance, Japanese Laid-Open Patent Publication (Kokai) No. 9-116886).

Further, for improving operability when specifying human subjects, there has been proposed a technology in which, the subjects' faces are detected using image recognition techniques, and an arbitrary region in a plurality of regions are selected automatically or by a user when the plurality of regions are detected (see, for instance, Japanese Laid-Open Patent Publication (Kokai) No. 2005-86682).

However, since the increased functionality of digital products has tended to increase the number of operations buttons on remote controllers and the like, unseasoned users' confusion when attempting to perform a desired operation has become a problem. An increase in operability is therefore required as well as the increase of functions.

For instance, in the technology disclosed in the above-described Japanese Laid-Open Patent Publication (Kokai) No. 2001-145094, it is assumed that the image display device is a computer terminal and the region is selected mainly using a mouse. Hence this technology is not suitable for selecting regions using operations buttons of an image display device such as a mobile telephone, or a digital TV.

In the technology disclosed in the above-described Japanese Laid-Open Patent Publication (Kokai) No. 2004-172655, two operations are necessary, the operation to indicate the central point and the operation to adjust the range of the area. This makes the overall operation complicated.

Further, in the technology of the above-described Japanese Laid-Open Patent Publication (Kokai) No. 9-116886, although a plurality of rectangles are prepared for selecting the region, when no rectangle of a size equivalent to the region to be selected is available, a region that is one size larger must be selected. In this case, areas not required by the original selection are included in the selected region.

Also, since the shape the rectangles for selecting the region are predetermined, it is not possible to specify an intricately shaped region, such as a region defined by the outline of a house or the like.

In the above-described Japanese Laid-Open Patent Publication (Kokai) No. 2005-86682, image recognition is performed, and it is therefore possible to extract a region such as the above-described outline of the house. In reality, the region to be selected may be a person rather than a house, and any size and shape is conceivable as the selected region.

In the above-described Japanese Laid-Open Patent Publication (Kokai) No. 2005-86682, the image extraction is performed with a limited of predefined targets for image recognition, and it is sometimes the case that the region to be selected cannot be flexibly switched.

SUMMARY OF THE INVENTION

The present invention provides a control apparatus, a control method, and a program for implementing the method capable of further improving operability and flexibility of operations related to the image.

In the first aspect of the present invention, there is provided a control apparatus comprising an image inputting unit adapted to input images, an image recognizing unit adapted to recognize at least one of objects in an image inputted by the image inputting unit, a region extracting unit adapted to extract a region related to the at least one of objects based on object information obtained by the image recognizing unit, a region selecting unit adapted to select the extracted region extracted by the region extracting unit, by performing at least one of range control and change of extracted region on the extracted region in response to an operation of an operating unit, and a selection region controlling unit adapted to perform predetermined controls on the extracted region selected by the region selecting unit.

In the second aspect of the present invention, there is provided a control method comprising an image inputting step of inputting images, an image recognizing step of recognizing at least one of objects in the image inputted in the image inputting step, a region extracting step of extracting a region related to the at least one of objects based on object information obtained in the image recognizing step, a region selecting step of selecting the extracted region extracted in the region extracting step, by performing at least one of range control and change of extracted region on the extracted region in response to an operation of an operating unit, and a selection region controlling step of performing predetermined controls on the extracted region selected in the region selecting step.

In the third aspect of the present invention, there is provided a program for causing a computer to implement a control method, comprising an image inputting module for inputting images, an image recognizing module for recognizing at least one of objects in the image inputted by the image inputting module, a region extracting module for extracting a region related to the at least one of objects based on object information obtained by the image recognizing module, a region selecting module for selecting the extracted region extracted by the region extracting module, by performing at least one of range control and change of extracted region on the extracted region in response to an operation of an operating unit, and a selection region controlling module for performing predetermined controls on the extracted regions selected by the region selecting module.

According to the present invention, it is possible to select and control a predetermined region in an image using operations buttons of a mobile telephone, digital TV, or the like, and thereby simply and flexibly realize an operation for region selection. Hence, it is possible to improve operability and flexibility of operations related to the image.

Further features and advantages of the present invention will become apparent from the following detailed description of exemplary embodiments with reference to the attached drawings.

DETAILED DESCRIPTION OF THE PREFERRED EMBODIMENTS

Embodiments of the present invention will be described in detail with reference to drawings showing preferred embodiments thereof.

In the present embodiment, it is assumed that images from a remotely installed network camera are observed on a digital TV which can be operated using a remote controller. In this case, in a control apparatus according to the present invention, the network camera is dealt with as an image inputting unit, the digital TV as an image displaying unit, and the remote controller as an operating unit.

Figure 1:
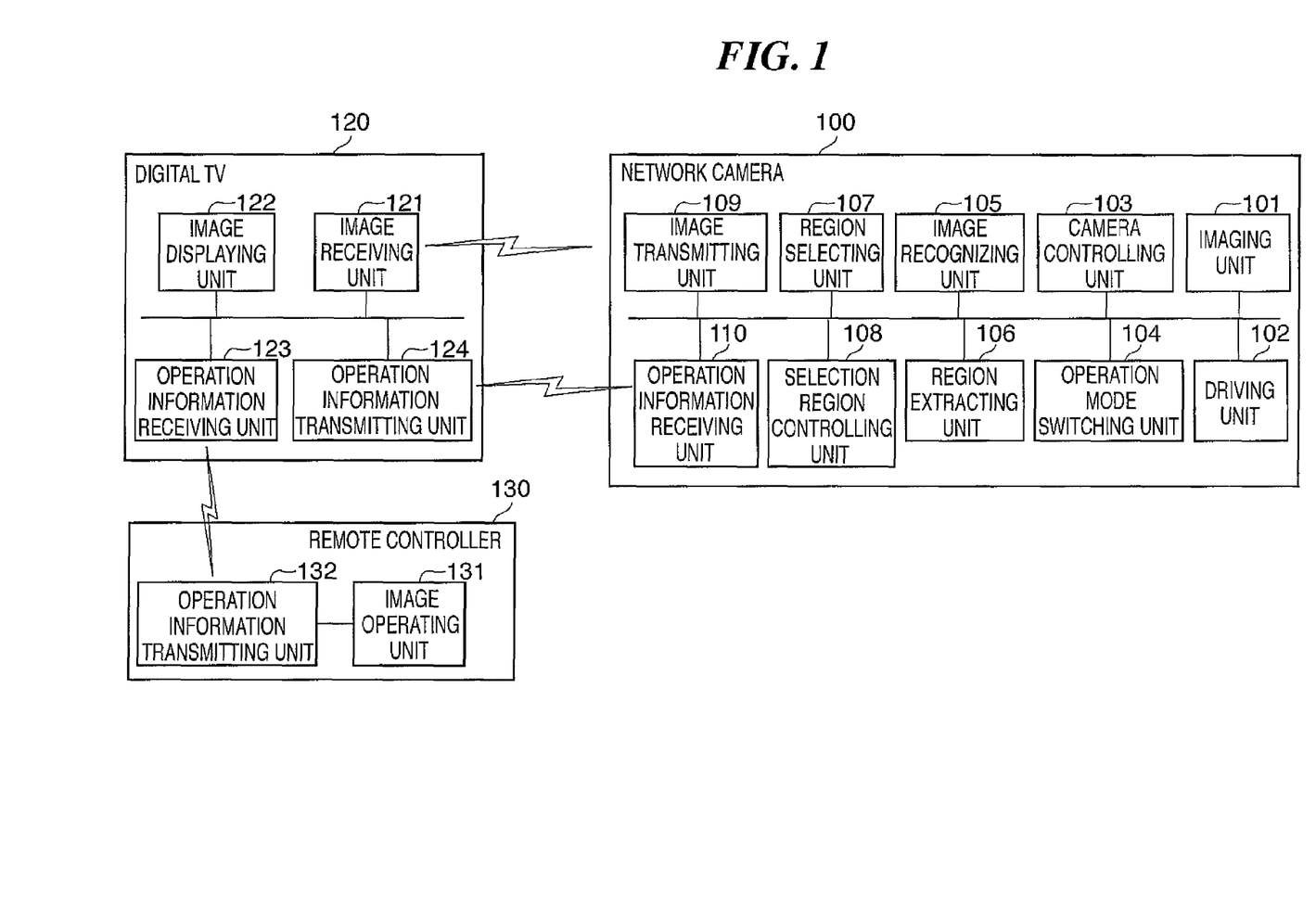
FIG. 1 is a view schematically showing a system construction of a control apparatus according to an embodiment of the present invention.

FIG. 1 is a view schematically showing a system construction of a control apparatus according to an embodiment of the present invention.

In FIG. 1, the control apparatus (system) is comprised of a network camera 100, a digital TV 120, and a remote controller 130.

The network camera 100 includes an image pickup unit 101, a driving unit 102, a camera controlling unit 103, an operation mode switching unit 104, an image recognizing unit 105, a region extracting unit 106, and a region selecting unit 107. The network camera 100 further includes a selection region controlling unit 108, an image transmitting unit 109, and an operation information receiving unit 110.

The driving unit 102 controlled by the camera controlling unit 103 changes a direction of the image pickup unit 101, and the image pickup unit 101 captures images in the direction resulting from the change.

The operation mode switching unit 104 switches an operation mode of the network camera 100 to either an image observation mode or a region selection mode in response to remote controller operations by a person (hereinafter referred to "user") who is observing the images from the network camera 100 on the digital TV 120.

When the operation mode described above is set to the region selection mode, the image recognizing unit 105 recognizes each of the various bodies, including buildings and people, (hereinafter referred to "objects") as separate images. Since the technology for recognizing images is not included in the scope of the present invention, a detailed description of this technology is omitted.

When the operation mode described above has been set to the region selection mode, the region extracting unit 106 implements image processing and extracts one or more regions from the objects recognized by the image recognition.

When the operation mode described above has been set to the region selection mode, the region selecting unit 107 performs enlargement/reduction of the extracted object region or updates the objects to be extracted in response to remote controller operations by the user.

When the operation mode described above has been set to the region selection mode, the selection region controlling unit 108 executes predetermined processing on the region selected by the region selecting unit 107 in response to remote controller operations by the user.

The image transmitting unit 109 transmits images sent from the image pickup unit 101 to the digital TV 120 which is the image display device. When the operation mode described above has been set to the region selection mode, the image transmitting unit 109 transmits images on which image processing has been implemented to extract one or more regions.

The operation information receiving unit 110 receives the operation information related to control of the network camera 100, among the operation information resulting from use of the remote controller 130 by the user, from the digital TV 120.

The digital TV 120, which is the image displaying unit, includes an image receiving unit 121, an image displaying unit 122, an operation information receiving unit 123, and an operation information transmitting unit 124.

The image receiving unit 121 receives images transmitted from the network camera 100, and displays the received images using the image displaying unit 122. The image displaying unit 122 is also capable of displaying a predetermined user interface when the user performs a given operation using the remote controller 130.

Further, operation information resulting from use of the remote controller 130 by the user is received by the operation information receiving unit 123, and the operation information related to control of the network camera 100, among the received operation information, is transmitted to the network camera 100 by the operation information transmitting unit 124.

The remote controller 130, which is the operating unit, includes an image operating unit 131, and an operation information transmitting unit 132.

The operating unit 131 receives the various operations resulting from button operations by the user on the remote controller 130, and the resulting operation information is transmitted to the digital TV 120 by the operation information transmitting unit 132.

The following describes a construction of the user-operated remote controller 130 of the digital TV 120.

Figure 2:
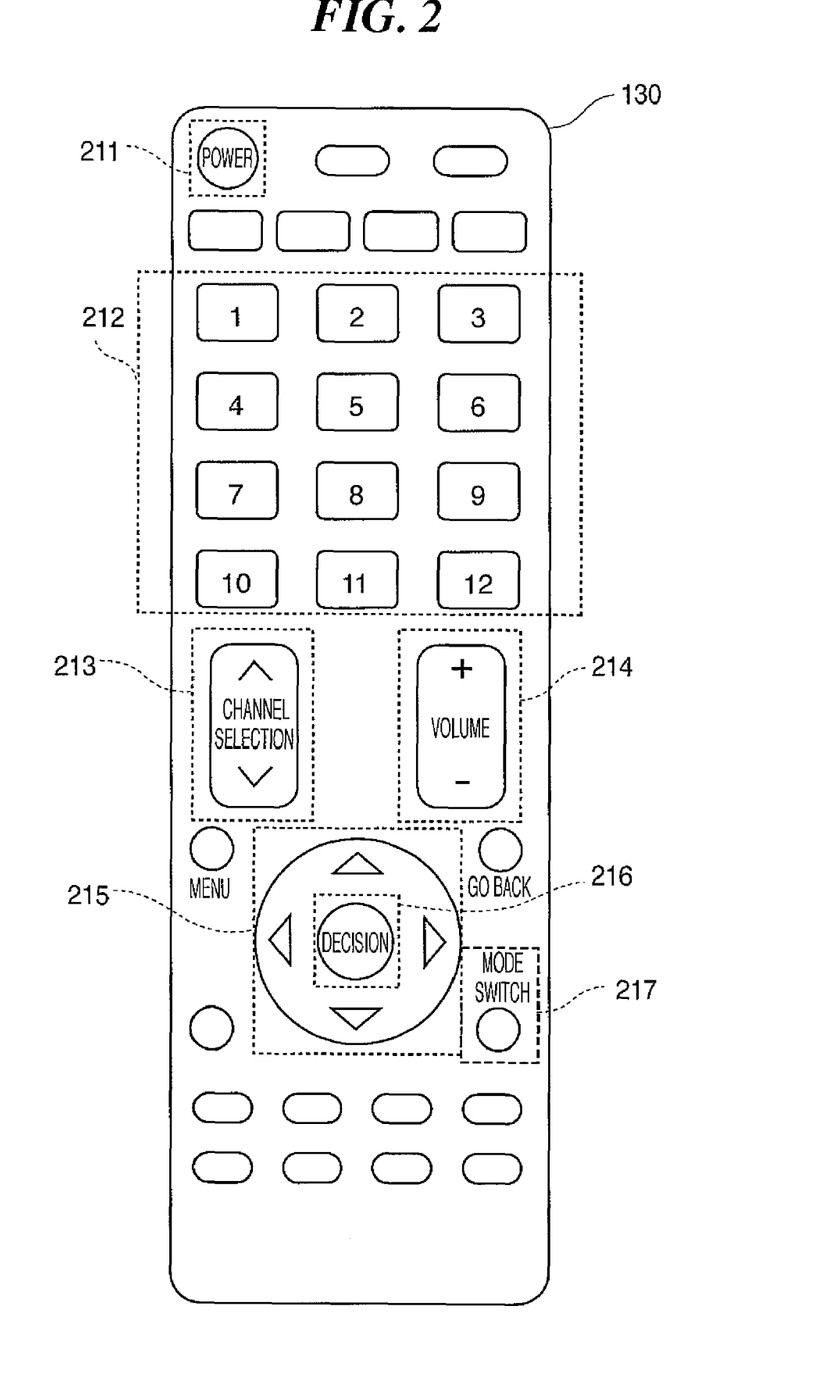
FIG. 2 is a view showing a construction of a remote controller of a digital TV in FIG. 1.

FIG. 2 is a view showing a construction of the remote controller 130 in FIG. 1.

In FIG. 2, the remote controller 130 includes a power button 211, numbers buttons 212, channel selection buttons 213, volume buttons 214, a cross-key 215, a decision button 216, a mode switching button 217, and various other buttons.

Figure 3:
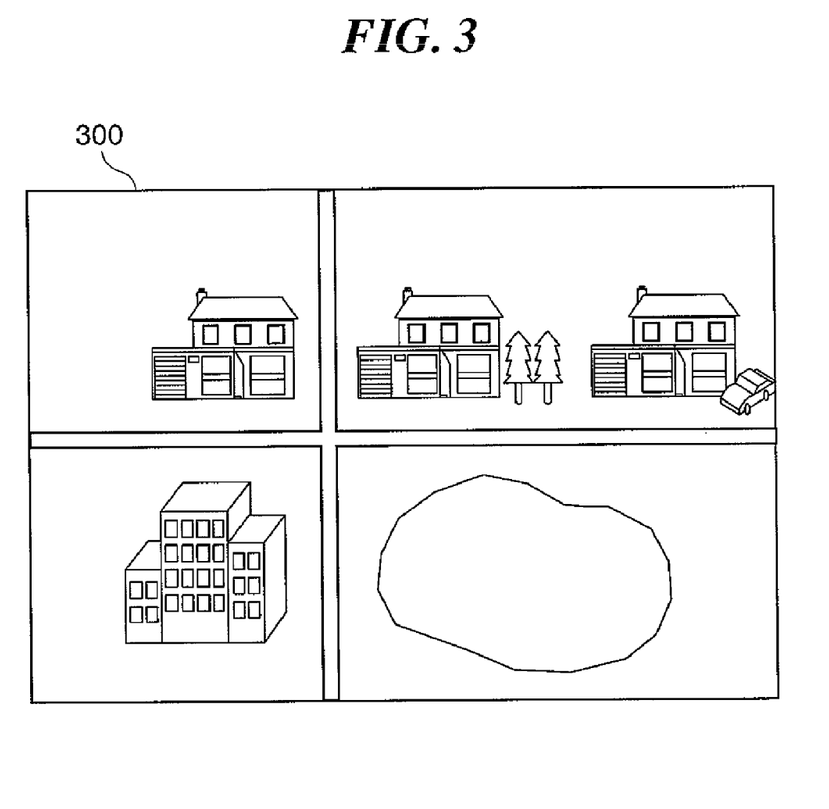
FIG. 3 is a view showing images captured by a network camera in FIG. 1.

The following describes operations of the present embodiment when camera images 300 of the type shown in FIG. 3 are captured by the network camera 100.

When the user observes images from the remotely installed network camera 100, the image mode is switched as described below using the mode switching button 217. Switching is performed using the mode switching button 217 to select either the first image mode in which the images are to be observed while simply controlling the direction and viewing angle of the camera, or the second image mode in which mosaic processing is to be implemented on a specific region included in the image or the region is to be set in a preset position.

Figure 4:
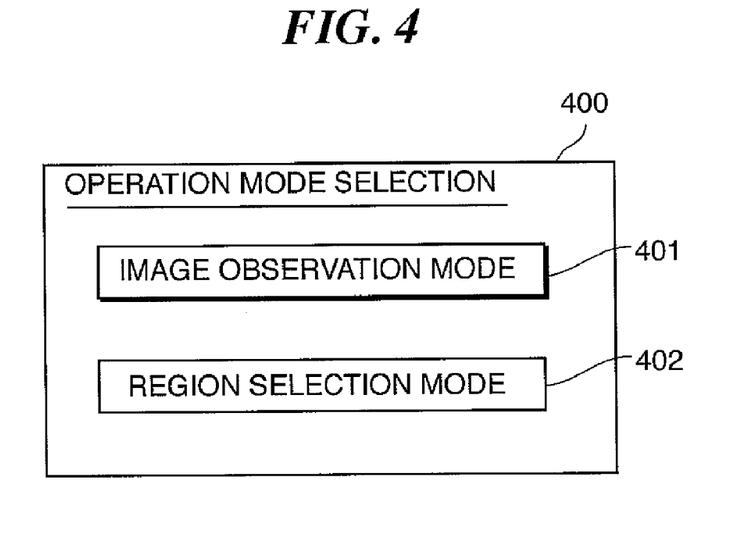
FIG. 4 is a view showing an operating mode selection screen displayed by an image displaying unit in FIG. 1.

FIG. 4 is a view showing an operating mode selection screen displayed by the image displaying unit of the digital TV in FIG. 1 when the mode switching button 217 shown in FIG. 2 is depressed.

As shown in FIG. 4, the user depresses up or down on the cross-key 215 to select either an image observation mode 401 or a region selection mode 402, and decides the operation mode by depressing the decision button 216.

Information about the operation mode selected by the user is communicated to the network camera 100 via the digital TV 120. The default setting of the operation mode is the image observation mode, which allows the user to perform network camera 100 pan/tilt/zoom operations on the camera image 300 by operating the cross-key 215 and the volume button 214.

When the user has set the operation mode using a button operation on the remote controller 130, the resulting information is stored in the operation mode switching unit 104 in the network camera 100. When the stored operation mode is the image observation mode, the functions of the image recognizing unit 105, the region extracting unit 106, the region selecting unit 107, and the selection region controlling unit 108 are deactivated.

Then the camera image 300 captured by the image pickup unit 101 is transmitted unaltered by the image transmitting unit 109, and displayed by the image displaying unit 122 in the digital TV 120.

In contrast, when the stored operation mode is the region selection mode, the functions of the image recognizing unit 105, the region extracting unit 106, the region selecting unit 107, and the selection region controlling unit 108 are activated.

Figure 5:
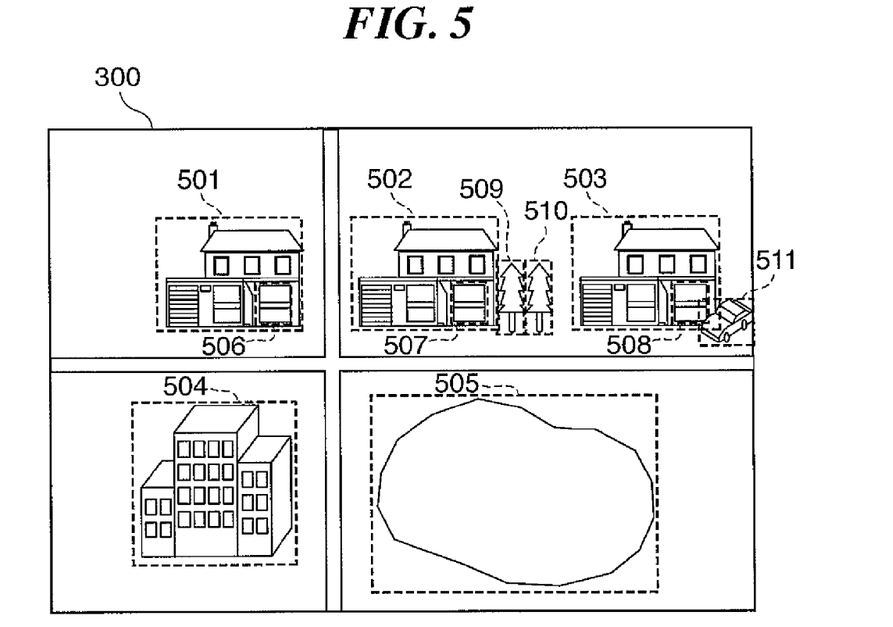
FIG. 5 is a schematic view showing a result of image recognition by an image recognizing unit in FIG. 1.

Image recognition is then performed by the image recognizing unit 105 on each object included in the camera image 300 captured by the image pickup unit 101. FIG. 5 is a schematic view showing a result of the image recognition.

In FIG. 5, regions corresponding to area 501 to area 511 in the camera image 300 are recognized as objects by the image recognizing unit 105. The image recognizing unit 105 records each region recognized as an object together with size and position data in a database.

Figure 6:
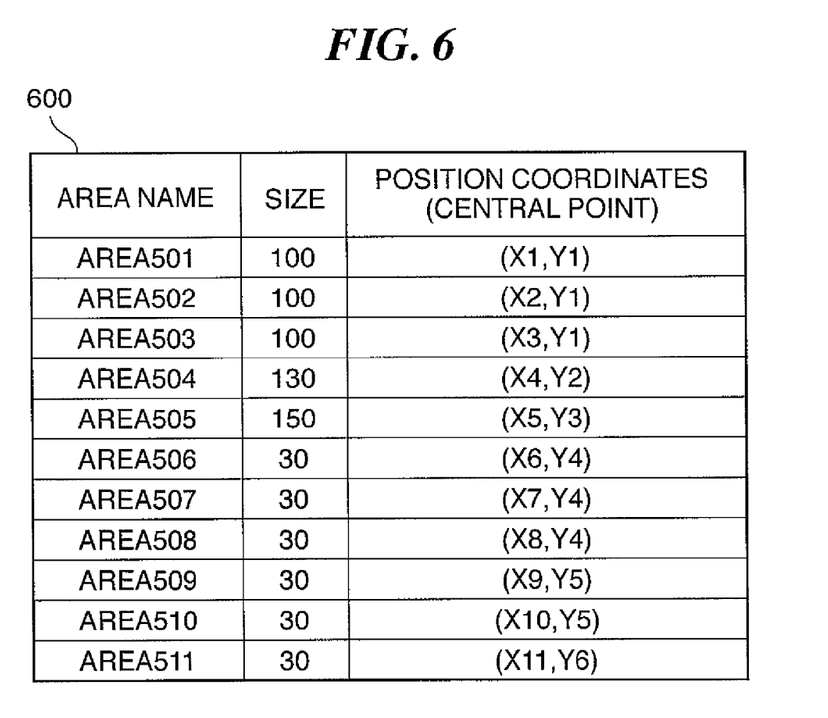
FIG. 6 is a view showing a database storing information about regions recognized as objects by the image recognizing unit in FIG. 1.

FIG. 6 is a view showing the database storing information about regions recognized as objects by the image recognizing unit 105 shown in FIG. 1.

The database 600 in FIG. 6 stores a size and coordinates of a central point for each of area 501 to area 511. Each stored size value is either an absolute value calculated from the coordinates or a relative value obtained from a comparison with another region.

When an object included in the camera image is recognized by the image recognizing unit 105, the corresponding region is extracted by the region extracting unit 106. In the present embodiment, the object region with the most central position in the image screen is extracted as the default region.

Figure 7:
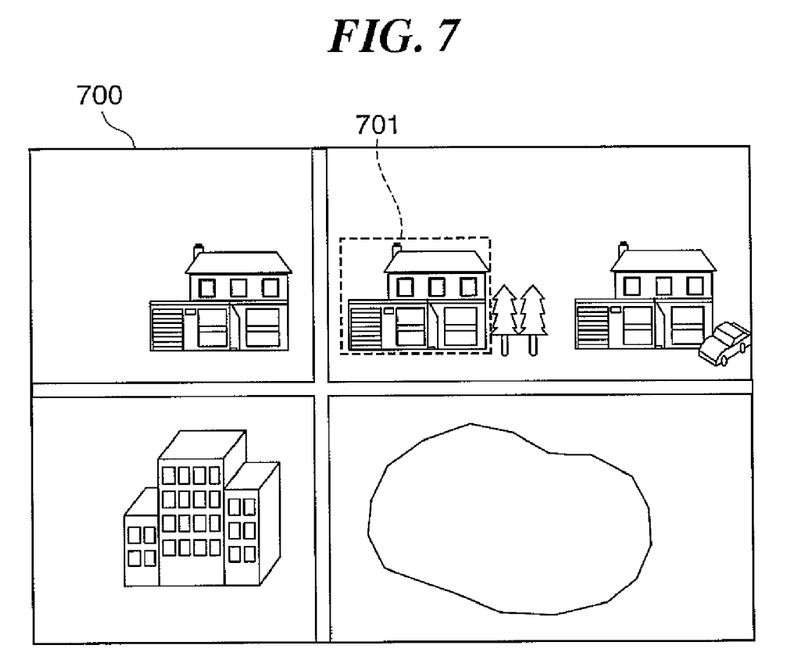
FIG. 7 is a view showing a default region extracted by a region extracting unit in FIG. 1.

FIG. 7 is a view showing a default region extracted by the region extracting unit 106 shown in FIG. 1.

Figure 8:
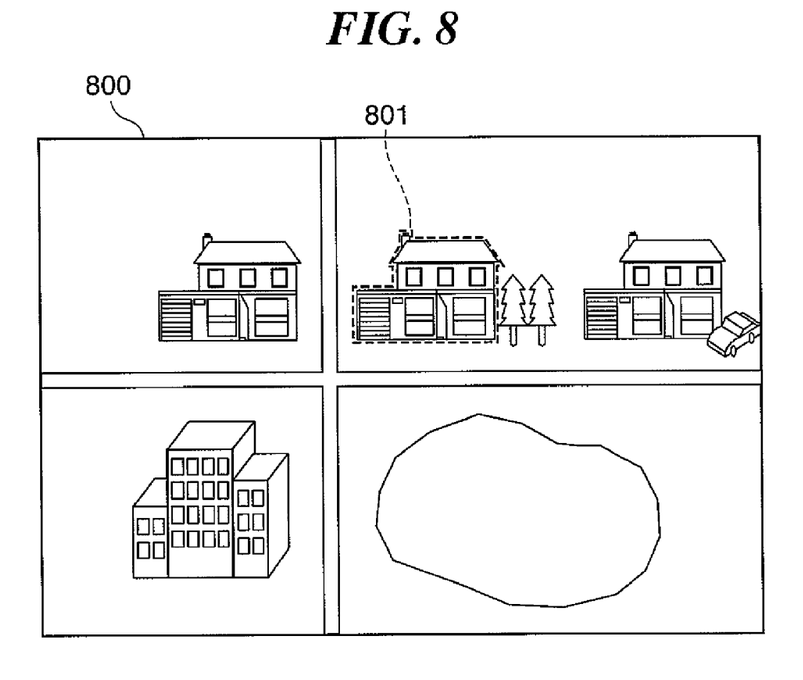
FIG. 8 is a view showing a variation of a default region extracted by the region extracting unit in FIG. 1.

In FIG. 7, the region 701 extracted as the default region is framed. Note that, although in the present embodiment the extracted region is rectangular, a region matching the shape of the object may be extracted in the manner of a region 801 in FIG. 8.

Also, although the extracted region is displayed in a frame in the present embodiment, the present invention does not limit the display method for the extracted region, and various modifications are possible. For instance, the extracted region could be displayed in a different color.

When the user has specified the region selection mode, the image 700 including the region 701 extracted as shown in FIG. 7 is transmitted by the image transmitting unit 109, and displayed by the image displaying unit 122 in the digital TV 120.

When the region selection mode has be specified, the user can change the region that is to be selected by depressing the up, down, left, and right buttons of the cross-key 215 on the remote controller 130. On receiving notification that the cross-key 215 has been depressed by the user, the network camera 100 enlarges or reduces the range of the region to be selected or changes the region to be selected.

Figure 9:
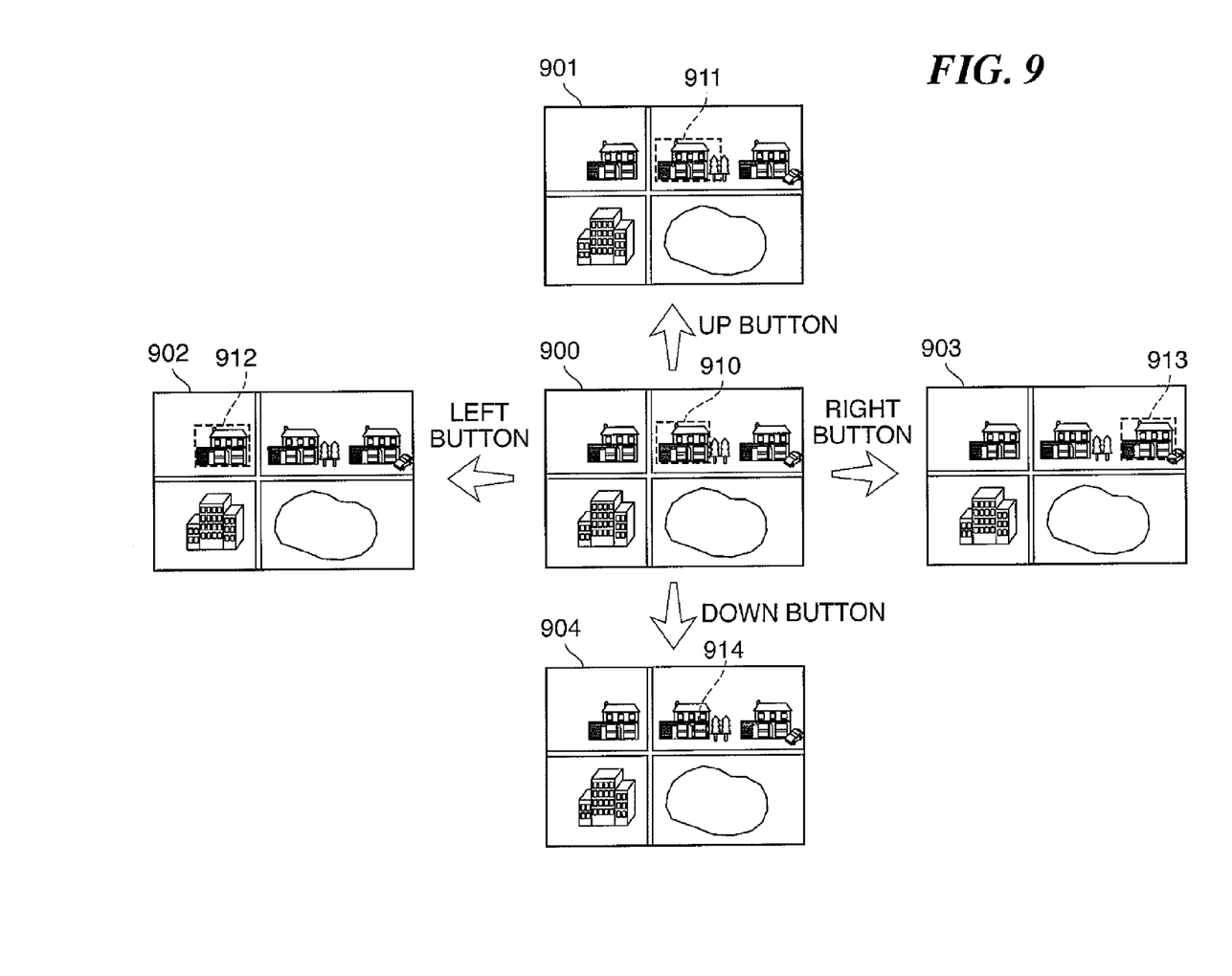
FIG. 9 is a view showing regions to be newly selected when up, down, left and right buttons of a cross-key in FIG. 2 are depressed.

FIG. 9 is a view showing regions to be newly selected in a camera image 900 when up, down, left, and right buttons of the cross-key 215 shown in FIG. 2 are depressed.

As shown in FIG. 9, when the up button of the cross-key 215 is depressed by the user, the region selecting unit 107 refers the database 600 storing the size and position information for each area in the region extracting unit 106. Next, a region 911 which includes but is one size larger than a current extracted region 910 is selected.

On the other hand, when the down button is depressed, a region 914 within and one size smaller than the current extracted region 910 (region corresponding to the region 507 in FIG. 5) is selected. When the left button is depressed, a region 912 to the left of and approximately the same size as the current extracted region 910 is selected.

When, on the other hand, the right button is depressed, a region 913 to the right of and approximately the same size as the current extracted region 910 is selected. When the left or right button is depressed but there is no region of approximately the same size as the region 910, another region on the left side or right side is selected accordingly.

The region selecting unit 107 refers the database 600 storing the size and position information for each area extracted by the region extracting unit 106 for judging which region to select as the region that is one size larger, the region that is one size smaller, or the different region. The area is then selected based on the referred information.

The user is able to select a desired region by button operations using the cross-key 215, and decide what type of processing to implement on the desired region by depressing the decision button 216.

Figure 10:
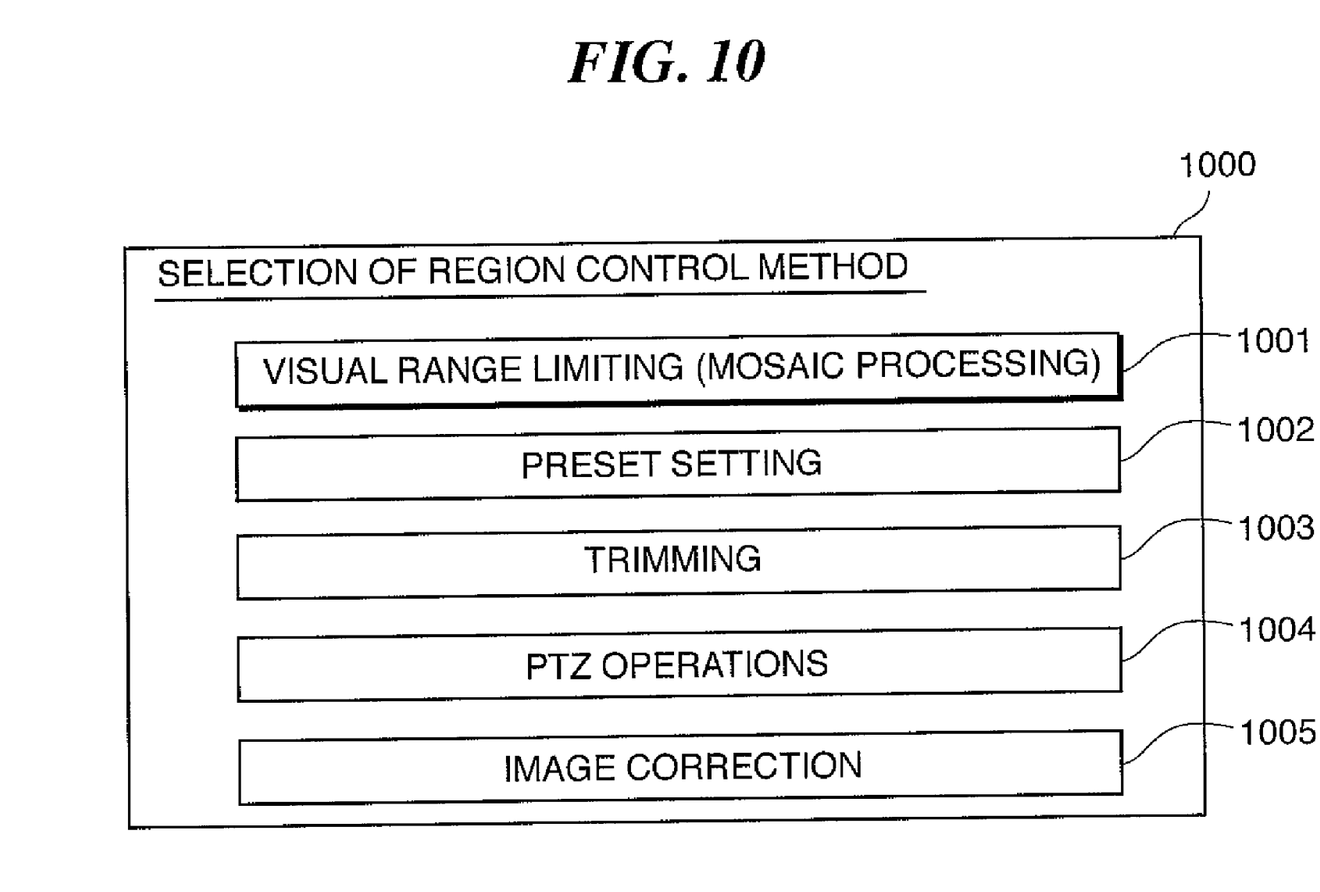
FIG. 10 is a view showing a region control method selection screen displayed by the image displaying unit of the digital TV shown in FIG. 1 when a user selects a region and depresses the decision button.

FIG. 10 is a view showing a region control method selection screen displayed by the image displaying unit 122 of the digital TV shown in FIG. 1 when the user selects a region and depresses the decision button.

As shown in FIG. 10, the user decides the region control method by depressing the up and down buttons on the cross-key 215 to select any of visual range limiting (mosaic processing) button 1001, preset setting button 1002, trimming button 1003, a PTZ (pan/tilt/zoom) operation button 1004, and image correction button 1005, and depressing the decision button 216. The information about the region control method selected by the user is transmitted to the network camera 100 via the digital TV 120.

The selection region controlling unit 108 of the network camera 100 implements predetermined processing on the region in accordance with the region control method selected by the user.

Figure 11:
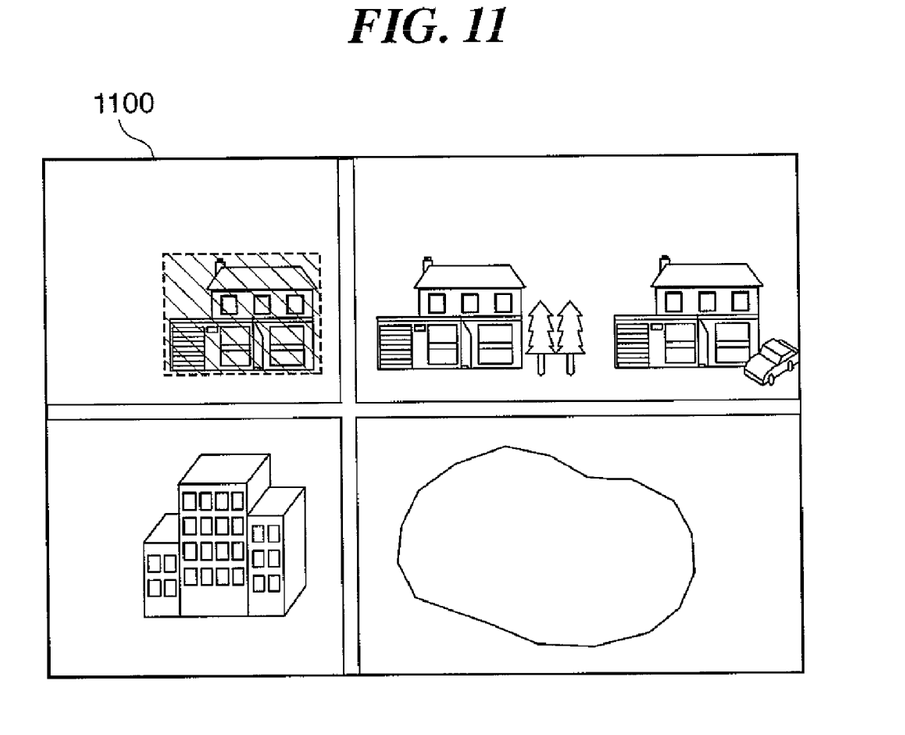
FIG. 11 is a view showing the case where visible range limiting, as shown in FIG. 10, is set for the region.
Figure 12:
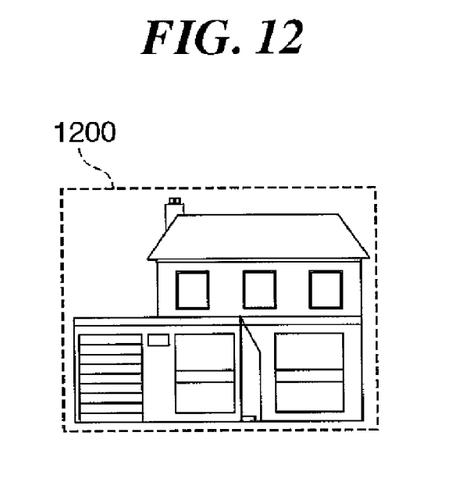
FIG. 12 is a view showing the case where a pan/tilt/zoom operation, as shown in FIG. 10, is set for the region.

FIG. 11 is a view showing the case where the user has set the visual range limiting for the region that is area 1100, and FIG. 12 is a view showing the case where the user has set the PTZ operation for the region that is area 1200.

According to the present embodiment, it is possible for the user to select a desired region by a simple button operation on the remote controller 130, and to thereby realize the desired processing with ease, even when viewing the images on a digital TV 120.

In the present embodiment, the user operation to select the region was described as being performed using the cross-key 215 alone. However, the present invention is not limited to the above described embodiment. The selection may, for instance, be performed using the cross-key 215 and the volume button 214 in combination. In this case, the selected region can be changed using the cross-key 215, and enlargement/reduction of the selected region can be performed using the volume button 214. Alternatively, the functions such as the change of the selected region and the enlargement/reduction of the selected region described above can be assigned to other buttons on the remote controller 130.

In the present embodiment, a dedicated button for switching the operation mode (the mode switching button 217) is provided on the remote controller 130 of the digital TV 120. However, the present invention is not limited to the above described embodiment. It may be configured such that, for instance, the operation mode is switchable using a menu button provided on the remote controller 130.

In the present embodiment, the functions of the operation mode switching unit 104, the image recognizing unit 105, the region extracting unit 106, the region selecting unit 107, and the selection region controlling unit 108 are all provided in the network camera 100. However, the present invention is not limited to the above-described embodiment. All the functions may be provided in the digital TV 120 which is the image displaying unit. Alternatively, the functions may be shared between the network camera 100 and the digital TV 120.

In the present embodiment, the control apparatus is configured with the image inputting unit, the image displaying unit, and the operating unit as separate devices. However, the present invention is not limited to the above-described embodiment. For instance, a single device which, like the digital camera, includes all the units may be used in place of the separate devices.

Moreover, although in the present embodiment only still images is to be selected as the object of selection when selecting the regions, the present invention is not limited to this arrangement. It goes without saying that a moving image is also to be selected as objects in the same way when the target is the moving image.

It is to be understood that the object of the present invention may be also be accomplished by supplying the system or the control apparatus with a storage medium in which a program code of software which realizes the functions of the above-described embodiment is stored, and causing a computer (or CPU or MPU) of the system or apparatus to read out the program code stored in the storage medium.

In this case, the program code read out from the storage medium realizes the functions of the embodiment described above, and hence the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program may be downloaded via a network.

Further, it is to be understood that the functions of the above-described embodiment may be accomplished not only by executing a program code read out by a computer, but also by causing an OS (operating system) or the like which operates on the computer to perform a part or all of the actual operations based on instructions of the program code.

Further, it is to be understood that the functions of the above-described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instruction of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-316116, filed Nov. 22, 2006, which is hereby incorporated by reference herein in its entirety.

What is claimed is:

1. A control apparatus comprising:
    an image inputting unit configured to input images from a camera;
    a region extracting unit configured to extract at least one object region in one of the images inputted by the image inputting unit;
    a region selection switching unit configured to switch a selected object region among the at least one extracted object region from a first object region to a second object region within the first object region, in a situation where a predetermined key of an operating unit is operated when the first object region has been selected; and
    a controlling unit configured to perform predetermined controls on the selected object region,
    wherein said units are implemented at least in part by a computer.

2. A control apparatus according to claim 1, wherein the region selection switching unit is configured to perform, in response to an operation of the operating unit, at least one of enlargement of the first object region, reduction of the first object region, and switching from the first object region to the second object region.

3. A control apparatus according to claim 1, wherein the controlling unit is configured to perform control that includes at least one of setting a preset object region as the selected object region, trimming the selected object region to form a trimmed region, performing predetermined image correction on the selected object region, setting a visual range limit on the selected object region, and performing pan/tilt/zoom camera control on the selected object region.

4. A control apparatus according to claim 1, further comprising a display control unit configured to display images based on the extracted at least one object region as a plurality of candidate object regions.

5. A control apparatus according to claim 1, further comprising:
an operation mode switching unit configured to switch an operation mode between an observation mode for browsing the input images on an image displaying unit and a selection mode for selecting an object region from one of the input images displayed by the image displaying unit, and
a changing unit configured to change an image pickup direction of the camera,
wherein the region selection switching unit is operable when the operation mode is switched to the selection mode, and the changing unit is operable when the operation mode is switched to the observation mode.

6. A control method comprising:
an image inputting step of inputting images from a camera;
a region extracting step of extracting at least one object region in one of the images inputted by the image inputting step;
a region selection switching step of switching a selected object region among the at least one extracted object region from a first object region to a second object region within the first object region, in a situation where a predetermined key of an operating unit is operated when the first object region has been selected; and
a controlling step of performing predetermined controls on the selected object region,
wherein said steps are implemented at least in part by a computer.

7. A control method according to claim 6, wherein the region selection switching step comprises performing, in response to an operation of the operating unit, at least one of enlargement of the first object region, reduction of the first object region, and switching from the first object region to the second object region.

8. A control method according to claim 6, wherein the controlling step comprises performing control that includes at least one of setting a preset object region as the selected object region, trimming the selected object region to form a trimmed region, performing predetermined image correction on the selected object region, setting a visual range limit on the selected object region, and performing pan/tilt/zoom camera control on the selected object region.

9. A control method according to claim 6, further comprising a display control step of displaying images based on the extracted at least one object region as a plurality of candidate object regions.

10. A control method according to claim 6, further comprising:
an operation mode switching step of switching an operation mode between an observation mode for browsing the input images on an image displaying unit and a selection mode for selecting an object region from one of the input images displayed by the image displaying unit, and
a changing step of changing an image pickup direction of the camera,
wherein the region selection switching step operates when the operation mode is switched to the selection mode, and the changing step operates when the operation mode is switched to the observation mode.

11. A non-transitory computer-readable storage medium storing a program for causing a computer to implement a control method, the program comprising:
an image inputting module for inputting images from a camera;
a region extracting module for extracting at least one object region in one of the images inputted by the image inputting module;
a region selecting selection switching module for switching a selected object region among the at least one extracted object region from a first object region to a second object region within the first object region, in a situation where a predetermined key of an operating unit is operated when the first object region has been selected; and
a controlling module for performing predetermined controls on the selected object region.

* * * * *